3,014,816
ACID-RESISTANT ENAMEL FOR STAINLESS STEEL

Burnham W. King and Marion C. Brockway, Columbus, Ohio, assignors, by mesne assignments, to Union Carbide Corporation, Niagara Falls, N.Y., a corporation of New York
No Drawing. Filed Oct. 21, 1959, Ser. No. 847,692
9 Claims. (Cl. 117—129)

This invention relates to enamel coating materials and, more particularly, to an enamel coating material for use on stainless steels.

Stainless steel structures and panels are often coated with ceramic-type coatings to afford corrosion resistance and decorative effects. However, the lack of suitable coating materials has hindered the development of this new architectural material. For example, the ceramic coating must be applied in a layer having a thickness on the order of 4 mils or more if a true, deep coloring is to be obtained. Furthermore, thicker ceramic coatings afford greater protection to the underlying steel structures from weather attack. However, despite the need for thicker coatings, present day coatings are applied in thin layers, often less than 2 mils, because of the lack of adherence of thicker coatings to the steel subsurface. This failure of the presently produced thicker coatings to adhere firmly to the steel results in cracking and spalling of the coating, especially when the underlying steel is subject to stress.

It is the primary object of this invention, therefore, to provide an enamel coating composition which can be applied to stainless steel as a coating of a greater thickness than heretofore produced.

It is also an object of this invention to provide an enamel coating composition for stainless steels which affords greater protection to the underlying steel because of its excellent acid and weather resistance.

It is a further object of this invention to provide an enamel coating composition for stainless steels which yields a ceramic coating of a predictable color and which is amenable to changes in color through the addition of pigments.

It is another object of this invention to provide an article of manufacture comprising a stainless steel article having a ceramic coating.

Other aims and advantages of this invention will be apparent from the following description and appended claims.

In accordance with the present invention, an enamel coating composition is provided consisting essentially of from about 45 to about 85 parts by weight silica, from about 2 to about 25 parts by weight vanadium pentoxide, from about 17 to about 27 parts by weight of at least one of the oxides of sodium and potassium, up to 25 parts by weight titanium dioxide, up to 12 parts by weight calcium oxide, up to 12 parts by weight boron oxide, and up to 20 parts alumina, the boron oxide and alumina being present in a minimum combined amount of at least 5.5 parts by weight.

In a preferred composition of the coating material the constituents are present in the percentage ranges given in Table I. It will be noticed that a minimum total amount of $B_2O_3$ and/or $Al_2O_3$ of 5.5 percent by weight is required.

Table I

| Constituent: | Parts by weight |
| --- | --- |
| $SiO_2$ | 50 to 75 |
| $V_2O_5$ | 7 to 20 |
| $Na_2O$ and/or $K_2O$ | 19 to 23 |
| $TiO_2$ | 2 to 15 |
| $CaO$ | 0 to 10 |
| $B_2O_3$ | 0 to 6 |
| $Al_2O_3$ | 0 to 7 |

The oxide enamel compositions given above contain as the principle glass-forming oxides $SiO_2$ and $B_2O_3$. Included in the mixture should be one or more alkalies, such as $Na_2O$ and $K_2O$ in at least the minimum amounts specified. The chemical stability of the enamel is improved by the addition of $Al_2O_3$, $TiO_2$, and $CaO$. Additionally it is required that there be a minimum combined amount of $B_2O_3$ and $Al_2O_3$ of 5.5 parts by weight to avoid water solubility. The $TiO_2$ addition is effective in improving the acid resistance.

The addition of $V_2O_5$ to the enamel composition serves to increase the degree of enamel adherence to the steel subsurface thus making possible the application of thicker coatings. The $V_2O_5$ addition also produces a greater degree of acid resistance in the enamel.

The enamel coating compositions described above are produced from a batch composition which is smelted to form a fluid glass. The glass is then quenched to obtain an enameling frit, or coating composition. This frit is then applied to the surface of an article, such as a stainless steel article, which is fired in such manner as to transform the frit into an enamel coating.

The raw materials should be smelted within the temperature range of 2500° to 2800° F. for from 20 to 60 minutes. The resulting glass composition is quenched to form a frit and the frit is ground with clay and water to produce a slip having the desired consistency. The slip is then applied to a stainless steel surface in any suitable manner, such as by painting, dipping or spraying. The firing should preferably be performed at temperatures within the range of 1600° to 1700° F. for from 5 to 10 minutes. The temperature range for enameling, however, may be broadened to a temperature range of from 1300° to 1850° for from 3 to 20 minutes. Enamel coatings on stainless steel surfaces may thus be produced which have substantial thickness, as for instance on the order of 5 to 10 mils, and which have good chemical durability, and which adhere firmly to the stainless steel.

An enamel coating produced within the above preferred compositional range is characterized by Class AA acid resistance. Class AA acid resistance is the designation of the Porcelain Enamel Institute for materials which pass the following test: specimens are exposed to a 10 percent aqueous solution of citric acid at room temperature for a period of 15 minutes. If no stain is visible and if the specimen passes the "dry rub" test, the enamel is considered to be Class AA acid resistant. The "dry rub" test is the following: the specimen is subjected to pencil marking with a No. 1 lead pencil across both the acid-treated areas of the specimen and the non-treated areas. The specimen is then rubbed with a clean dry cloth. If the marks are retained more tenaciously on the acid-treated area than on the non-treated area, the specimen fails the test.

Enamel coatings on stainless steel produced within the preferred range are further characterized by good enamel fit and fair or better adherence. Good enamel fit refers to the enamel having a coefficient of thermal expansion equal to or a little less than that of stainless steel. With changes in temperature, the enamel and metal expand and contract together and there is no danger of spontaneous chipping or cracking of the enamel.

Adherence refers to the tenacity with which the enamel adheres to the steel subsurface, especially when the steel is stressed, and is rated from excellent to good, better, fair, poor, and no adherence. The adherence characteristics can be determined visually by observing the amount of coating still adhering to an enameled sheet after the sheet is bent or hit with a hammer. When the steel is stressed sufficiently to cause the metal to deform plastically, as by a hammer blow, the enamel will crack. If the adherence is excellent, the metal will remain completely covered with adherent chips of enamel. If there is essentially no adherence, the enamel will be completely removed leaving bare metal. If the adherence is poor, there will be considerable bare metal, but there also will be a small amount of enamel still adhering to the metal.

Coatings of enamel on stainless steel prepared outside the compositional limits of the preferred ranges but within the broad range stated above are also characterized by Class AA acid resistance, but only fair enamel fit, and slight or better adherence than prior enamel compositions.

The following specific example is given to illustrate the preparation of an enamel composition falling within the scope of the present invention. Raw batch materials were manually dry-mixed together in the quantities given in Table II.

*Table II*

| Raw batch constituent: | Grams |
|---|---|
| Flint | 146.7 |
| Vanadium pentoxide, C.P. | 45.0 |
| Sodium nitrate | 16.0 |
| Potassium nitrate | 2.7 |
| Sodium carbonate | 74.7 |
| Titanox RA 10 | 25.5 |
| Calcium carbonate | 26.6 |
| Anhydrous borax | 13.0 |
| Clinchfield feldspar No. 202 | 60.0 |

It is essential that the vanadium source be smelted directly into the frit composition rather than adding it to the frit during the milling operations. The importance of this requirement was substantiated experimentally in a series of tests, wherein $V_2O_5$ was introduced as a mill addition to the frit rather than as a distinct constituent to the raw batch oxides. The resultant slurry thickened rapidly on storing and, after only one day, became highly thixotropic. Slips prepared from a frit in which $V_2O_5$ was already included as an original component, however, retained their original consistency and did not require reconditioning after storage of more than a week. This feature is of particular importance in commercial applications where it is customary to store a milled slip for from 8 to 24 hours before use. In addition, more uniform colors are obtained when frits are employed in which the $V_2O_5$ has been smelted than when $V_2O_5$ is a mill addition, especially at low firing temperatures. Smelted-in $V_2O_5$ frits also produce coatings having superior adherence on stainless steel.

The mixed batch of Table II was smelted in a 250 cc. fire clay crucible in a gas-fired furnace at a temperature of approximately 2650° F. The resulting smelted glass was quenched in water to produce a frit. This frit had a composition, as calculated from the composition of the raw batch material, as given in Table III.

*Table III*

| Constituent: | Parts by weight |
|---|---|
| $SiO_2$ | 62.5 |
| $V_2O_5$ | 15.0 |
| $Na_2O$ | 18.4 |
| $K_2O$ | 2.6 |
| $TiO_2$ | 8.5 |
| $CaO$ | 5.0 |
| $B_2O_3$ | 3.0 |
| $Al_2O_3$ | 3.5 |

A liquid slip, or enameling suspension, was prepared from 200 grams of the above frit along with 8 grams of Tennessee No. 7 ball clay, 0.2 gram of sodium nitrite, and 90 milliliters of water. This mixture was pulverized by grinding in a ball mill for 4 hours.

The enamel slip thus prepared was applied to Types 302 and 202 stainless steel. Although no effort was made to attach criticality to coating thickness in these experiments, most coatings were such as to produce final fired enamel thickness of about 4 mils to about 6 mils, which thicknesses are substantially above those possible by the utilization of previous enameling compositions. The coated metals were fired for 10 minutes at temperatures of 1600, 1700, 1750 and 1800° F. The enamel coatings fired at 1700 and 1800° F. on Type 302 stainless steel had excellent adherence, Class AA acid resistance, and were dark, brown-black in color. When fired on Type 202 stainless steel at 1800° F., the enamel has good adherence, Class AA acid resistance, and was also brown-black in color. The enamels will also work satisfactorily on other members of the 200 Series and 300 Series stainless steels.

Additional tests were conducted in a manner similar to that stated above but with different compositions. Details of the batch compositions, frit compositions, smelting and enameling conditions, and enamel properties are listed in the tables below. Coat thicknesses were on the order of 5 mils. Examples 1 to 7 represent frit compositions falling within the preferred range, while Examples 8 and 9 are outside the preferred limits but within the broad range.

Table IV shows the raw batch compositions for all the examples along with the smelting conditions. The time required for smelting is higher in the examples of Table IV, than was originally recommended. This is due to the small-size crucible that was employed for smelting, the volume of which was not as great as that of the raw batch material. Accordingly, the crucible had to be repeatedly filled as the batch material was melted.

Table V shows the calculated oxide composition of the frit after smelting and quenching of the raw batch material. Table V also shows the enameling conditions of temperature and time of firing. Finally the physical and chemical properties of the enamel coating produced is given. The adherence properties, color, and acid resistance being shown.

Adherence in all instances was determined visually by observing the amount of glass which adhered to the convex side of an enameled sheet after bending it to a curvature of 1-inch radius.

*Table IV*

| Batch compositions of examples, parts by weight | Example No. | | | | | | | | |
|---|---|---|---|---|---|---|---|---|---|
| | 1 | 2 | 3 | 4 | 5 | 6 | 7 | 8 | 9 |
| Flint | 139.4 | 139.4 | 109.2 | 154.3 | 146.7 | 139.4 | 146.7 | 131.9 | 139.4 |
| $V_2O_5$, C.P. | 15.0 | 15.0 | 15.0 | 15.0 | 30.0 | 15.0 | 60.0 | 15.0 | 15.0 |
| Sodium nitrate | 17.1 | 17.1 | 17.1 | 17.1 | 16.0 | 17.1 | 16.0 | 16.7 | 17.1 |
| Potassium nitrate | 2.7 | 2.7 | 2.7 | 2.7 | 2.7 | 2.7 | 2.7 | 0 | 2.7 |
| Anhydrous sodium carb | 79.8 | 79.8 | 79.8 | 79.8 | 74.7 | 79.8 | 74.7 | 79.3 | 79.8 |
| Titanox RA 10 | 7.5 | 30.0 | 15.0 | 15.0 | 25.5 | 15.0 | 25.5 | 15.0 | 0 |
| Calcium carbonate | 41.0 | 41.0 | 41.0 | 41.0 | 26.6 | 0 | 26.6 | 41.0 | 41.0 |
| Anhydrous borax | 8.7 | 8.7 | 8.7 | 8.7 | 13.0 | 8.7 | 13.0 | 8.7 | 8.7 |
| Clinchfield feldspar #202 | 60.0 | 60.0 | 60.0 | 60.0 | 60.0 | 60.0 | 60.0 | 71.6 | 60.0 |
| Aluminum trihydrate | 0 | 0 | 0 | 0 | 0 | 0 | 0 | 26.7 | 0 |
| Smelting conditions: | | | | | | | | | |
| Type furnace | Gas | Gas | Gas | Gas | Gas | Gas | Gas | Gas | Gas |
| Max. temp., °F | 2,650 | 2,700 | 2,650 | 2,650 | 2,650 | 2,650 | 2,700 | 2,650 | 2,650 |
| Time at temp., min | 60 | 70 | 60 | 60 | 70 | 75 | 100 | 75 | 90 |

Table V

| Theoretical composition, parts by weight | Example No. | | | | | | | | |
|---|---|---|---|---|---|---|---|---|---|
| | 1 | 2 | 3 | 4 | 5 | 6 | 7 | 8 | 9 |
| $SiO_2$ | 60.1 | 60.1 | 50.0 | 65.0 | 62.5 | 60.1 | 62.5 | 60.1 | 60.1 |
| $V_2O_5$ | 5.0 | 5.0 | 5.0 | 5.0 | 10.0 | 5.0 | 20.0 | 5.0 | 5.0 |
| $Na_2O$ | 19.1 | 19.1 | 19.1 | 19.1 | 18.4 | 19.1 | 18.4 | 19.1 | 19.1 |
| $K_2O$ | 2.6 | 2.6 | 2.6 | 2.6 | 2.6 | 2.6 | 2.6 | 2.6 | 2.6 |
| $TiO_2$ | 2.5 | 10.0 | 5.0 | 5.0 | 8.5 | 5.0 | 8.5 | 5.0 | 0 |
| $CaO$ | 7.7 | 7.7 | 7.7 | 7.7 | 5.0 | 0 | 5.0 | 7.7 | 7.7 |
| $B_2O_3$ | 2.0 | 2.0 | 2.0 | 2.0 | 3.0 | 2.0 | 3.0 | 2.0 | 2.0 |
| $Al_2O_3$ | 3.5 | 3.5 | 3.5 | 3.5 | 3.5 | 3.5 | 3.5 | 10.0 | 3.5 |
| Enameling conditions: | | | | | | | | | |
| Temperature, °F | 1,700 | 1,650 | 1,600 | 1,700 | 1,800 | 1,750 | 1,700 | 1,700 | 1,700 |
| Time at temperature, min. | 10 | 10 | 10 | 10 | 10 | 10 | 10 | 10 | 10 |
| Enamel properties: | | | | | | | | | |
| Adherence | Fair | Fair | Fair | Fair | Good | Fair | Excellent | Poor | Poor |
| Color | Dark khaki | Khaki | Dark khaki | Khaki | Brown-black | Dark khaki | Brown-black | Green | Khaki-gray |
| Acid resistance | AA | AA | AA | AA | AA | AA | AA | AA | AA |

From the data presented above, it is readily apparent that Class AA acid resistance was achieved in each instance and that enamel compositions which fell within the preferred range (Examples 1 to 7) possessed fair to excellent adherence of the enamel coating to the stainless steel surfaces. Examples 8 and 9, while showing only "poor" adherence, still possess a high degree of usefulness.

In still another series of experiments, the effect of $V_2O_5$ additions with respect to adherence promotion on stainless steel was tested. Frit compositions having the oxide mixtures shown in Table VI were prepared. These frits were applied to Types 202 and 302 stainless steels at the firing temperatures and times shown in Table VII. The degree of adherence is also shown in Table VII.

Table VI

| Example No. | Calculated oxide composition of frit, parts by weight | | | | | | | |
|---|---|---|---|---|---|---|---|---|
| | $SiO_2$ | $V_2O_5$ | $Na_2O$ | $K_2O$ | $TiO_2$ | $CaO$ | $B_2O_3$ | $Al_2O_3$ |
| 10 | 62.5 | 5.0 | 18.4 | 2.6 | 8.5 | 5.0 | 3.0 | 3.5 |
| 11 | 62.5 | 10.0 | 18.4 | 2.6 | 8.5 | 5.0 | 3.0 | 3.5 |
| 12 | 62.5 | 15.0 | 18.4 | 2.6 | 8.5 | 5.0 | 3.0 | 3.5 |
| 13 | 62.5 | 20.0 | 18.4 | 2.6 | 8.5 | 5.0 | 3.0 | 3.5 |

Table VII

Adherence characteristics of frits containing varying amounts of $V_2O_5$

| Example No. | Type 302 stainless steel, firing temperature, °F. (10 minutes) | | | | Type 202 stainless steel, firing temperature, °F. | | | |
|---|---|---|---|---|---|---|---|---|
| | 1,600 | 1,700 | 1,750 | 1,800 | 1,600 | 1,700 | 1,750 | 1,800 |
| 10 | | Negligible | Poor-fair | Poor | | | Poor | Poor-fair |
| 11 | | Fair | Fair-good | Good | | Poor | Poor | Good |
| 12 | Very poor | Good | Excellent | Excellent | Poor | Fair | Fair | Do. |
| 13 | Poor | do | do | do | do | Good | Good | |

Frits were also prepared having compositions similar to those of Examples 10 and 13 of Table VI but which contained 30 or 40 percent by weight $V_2O_5$. In each instance, less than Class AA acid resistance resulted. It was also noted that the enamel coating containing 40 percent by weight $V_2O_5$ became white and opaque during firing.

Although chemically pure vanadium pentoxide was used in the above test, other $V_2O_5$ sources, such as red cake, may be employed with equal effectiveness with respect to adherence promotion and acid resistance providing the batch composition is suitably corrected and enough red cake is added so that the vanadium oxide composition of the frit is in accordance with the ranges previously set forth.

Enamel coats prepared in the manner described above are further characterized by glossiness and colors ranging from light brown to brown-black. By the addition of ceramic pigments as mill additions, blue, green, brown, black, and probably red enamels could be produced by utilizing the compositions falling within the scope of the present invention as the base.

The present invention, which comprises the preparation of $V_2O_5$-containing frits for coating stainless steel, thus represents an important advance in the enamel industry. Thicker coatings of enamel, on the order of 5 to 10 mils, are capable of application on stainless steel surfaces by virtue of the superior adherence characterizing the enamels of the present invention. In addition, the excellent acid and weather resistance of the present enamel coatings on stainless steel makes possible a greater flexibility of use for enameled stainless steel panels, as for instance, for architectural purposes.

What is claimed is:

1. An enamel frit consisting essentially of from about 45 to about 85 parts by weight $SiO_2$, from about 7 to about 25 parts by weight $V_2O_5$, from about 17 to about 27 parts by weight in the aggregate of at least one alkali oxide selected from the group consisting of $Na_2O$ and $K_2O$, from about 2 to about 25 parts by weight $TiO_2$, up to 12 parts by weight $CaO$, up to 12 parts by weight $B_2O_3$, and up to 20 parts by weight $Al_2O_3$, the minimum amount in the aggregate of $B_2O_3$ and $Al_2O_3$ being at least 5.5 parts by weight.

2. An enamel frit consisting of from about 50 to about 75 parts by weight $SiO_2$, from about 7 to about 20 parts by weight $V_2O_5$, from about 19 to about 23 parts by weight in the aggregate of at least one alkali oxide selected from the group consisting of $Na_2O$ and $K_2O$, from about 2 to about 15 parts by weight $TiO_2$, up to 10 parts by weight $CaO$, up to 6 parts by weight $B_2O_3$, and up to about 7 parts by weight $Al_2O_3$, the minimum amount in the aggregate of $B_2O_3$ and $Al_2O_3$ being at least 5.5 parts by weight.

3. An enamel frit consisting essentially of about 15 parts by weight $V_2O_5$, about 18.4 parts by weight $Na_2O$, about 2.6 parts by weight $K_2O$, about 8.5 parts by weight $TiO_2$, about 5 parts by weight $CaO$, about 3 parts by weight $B_2O_3$, about 3.5 parts by weight $Al_2O_3$, and the balance substantially all $SiO_2$ in an amount of about 62.5 parts by weight and incidental impurities.

4. A method of producing an adherent, acid-resistant coating on a stainless steel surface comprising pulverizing an enameling frit consisting essentially of from about 45 to about 85 parts by weight $SiO_2$, from about 7 to about 25 parts by weight $V_2O_5$, from about 17 to about 27 parts by weight in the aggregate of at least one alkali oxide selected from the group consisting of $Na_2O$ and $K_2O$, from about 2 to 25 parts by weight $TiO_2$, up to 12 parts by weight CaO, up to 12 parts by weight $B_2O_3$, and up to 20 parts by weight $Al_2O_3$, the minimum amount in the aggregate of $B_2O_3$ and $Al_2O_3$ being at least 5.5 parts by weight, applying said frit on the surface to be coated, and firing it at a temperature between about 1300° F. and about 1850° F., for from about 3 to about 20 minutes to obtain an enamel coating.

5. A method of producing an adherent, acid-resistant coating on a stainless steel surface comprising pulverizing an enameling frit consisting essentially of from about 45 to about 85 parts by weight $SiO_2$, from about 7 to about 25 parts by weight $V_2O_5$, from about 17 to 27 parts by weight in the aggregate of at least one alkali oxide selected from the group consisting of $Na_2O$ and $K_2O$, from about 2 to 25 parts by weight $TiO_2$, up to 12 parts by weight CaO, up to 12 parts by weight $B_2O_3$, and up to 20 parts by weight $Al_2O_3$, the minimum amount in the aggregate of $B_2O_3$ and $Al_2O_3$ being at least 5.5 parts by weight, applying said frit on the surface to be coated, and firing it at a temperature between about 1600° F. and about 1700° F. for from about 5 to about 10 minutes to obtain an enamel coating.

6. A method of producing an adherent, acid-resistant coating on a stainless steel surface comprising pulverizing an enameling frit consisting essentially of from about 50 to about 75 parts by weight $SiO_2$, from about 7 to about 20 parts by weight $V_2O_5$, from about 19 to about 23 parts by weight in the aggregate of at least one alkali oxide selected from the group consisting of $Na_2O$ and $K_2O$, from about 2 to about 15 parts by weight $TiO_2$, up to about 10 parts by weight CaO, up to about 6 parts by weight $B_2O_3$ and up to about 7 parts by weight $Al_2O_3$, the minimum amount in the aggregate of $B_2O_3$ and $Al_2O_3$ being at least 5.5 parts by weight, applying said frit on the surface to be coated, and firing it at a temperature between about 1300° F. and about 1850° F. for from about 3 to about 20 minutes to obtain an enamel coating.

7. A method of producing an adherent, acid-resistant coating on a stainless steel surface comprising pulverizing an enameling frit consisting essentially of from about 50 to about 75 parts by weight $SiO_2$, from about 7 to about 20 parts by weight $V_2O_5$, from about 19 to about 23 parts by weight in the aggregate of at least one alkali oxide selected from the group consisting of $Na_2O$ and $K_2O$, from about 2 to about 15 parts by weight $TiO_2$, up to about 10 parts by weight CaO, up to about 6 parts by weight $B_2O_3$, and up to about 7 parts by weight $Al_2O_3$, the minimum amount in the aggregate of $B_2O_3$ and $Al_2O_3$ being at least 5.5 parts by weight, applying said frit on the surface to be coated, and firing it at a temperature between about 1600° F. and about 1700° F. for from about 5 to about 10 minutes to obtain an enamel coating.

8. An article of manufacture comprising a stainless steel member at least partially coated with an enamel coating formed by firing thereon an enamel frit consisting essentially of from about 45 to about 85 parts by weight $SiO_2$, from about 7 to about 25 parts by weight $V_2O_5$, from about 17 to about 27 parts by weight in the aggregate of at least one alkali oxide selected from the group consisting of $Na_2O$ and $K_2O$, from about 2 to 25 parts by weight $TiO_2$, up to 12 parts by weight CaO, up to 12 parts by weight $B_2O_3$, and up to 20 parts by weight $Al_2O_3$, the minimum amount in the aggregate of $B_2O_3$ and $Al_2O_3$ being at least 5.5 parts by weight.

9. An article of manufacture comprising a stainless steel member at least partially coated with an enamel coating formed by firing thereon an enamel frit consisting essentially of from about 50 to about 75 parts by weight $SiO_2$, from about 7 to about 20 parts by weight $V_2O_5$, from about 19 to about 23 parts by weight in the aggregate of at least one alkali oxide selected from the group consisting of $Na_2O$ and $K_2O$, from about 2 to about 15 parts by weight $TiO_2$, up to about 10 parts by weight CaO, up to about 6 parts by weight $B_2O_3$, and up to about 7 parts by weight $Al_2O_3$, the minimum amount in the aggregate of $B_2O_3$ and $Al_2O_3$ being at least 5.5 parts by weight.

References Cited in the file of this patent

UNITED STATES PATENTS

| 2,575,470 | Bennett et al. | July 5, 1949 |
| 2,829,062 | Bennett et al. | Apr. 1, 1958 |

FOREIGN PATENTS

| 176,415 | Austria | Oct. 26, 1953 |

OTHER REFERENCES

Tashimo et al.: J. Ceram. Assoc., Japan 61, 537–40 (1953), Chem. Sbs. 48:4194e.